United States Patent [19]
Goodband et al.

[11] Patent Number: 6,007,864
[45] Date of Patent: Dec. 28, 1999

[54] PROCESS FOR PROVIDING A FROZEN FISH PRODUCT

[75] Inventors: Rachel Mary Goodband, Kettering; Nicholas David Hedges, Towcester; Peter Wilding, Raunds, all of United Kingdom

[73] Assignee: Gorton's Division of Conopco, Inc., Gloucester, Mass.

[21] Appl. No.: 09/015,562

[22] Filed: Jan. 29, 1998

[30] Foreign Application Priority Data

Jan. 31, 1997 [GB] United Kingdom .................... 9702102

[51] Int. Cl.⁶ ...................................... A23L 1/325
[52] U.S. Cl. ........................... 426/643; 426/652; 426/524
[58] Field of Search ................................. 426/524, 643, 426/652

[56] References Cited

FOREIGN PATENT DOCUMENTS

| 2/211857 | 8/1990 | Japan . |
| 402211857A | 8/1990 | Japan . |

OTHER PUBLICATIONS

Yamamoto et al., Hydrostatic Pressure–induced Myosin Molecules in 0.5 M KLI at pH 6.0, Biosci Biotech Biochem, 57, 383 (1993).

McArthur et al., The Effect of High Pressure on Skeletal Muscle Myofibrils and Myosin, Gums and Stabilisers For the Food Industry vol. 8, 309–317 (1995).

Jarenback et al., Ultrastructural Changes During Frozen Storage of Cod Journal of Food Technology, vol. 10, p. 229 (1975).

Farr, High Pressure Technology in the Food Industry, Trends in Food Science & Technology, vol.. 1 (1990) p.14–16.

Ashie et al., Application of High Hydrostatic Pressure to Control Enzyme Related Fresh Seafood Texture Deterioration Food Research International, vol. 29, No. 5–6 pp. 569–575, (1996).

Carr et al., Effects of Diffusion on Free Precession in Nuclear Magnetic Resonance Experiments, Physical Review, 94, 630–638 (1954).

Meiboom et al., Modified Spin–Echo Method for Measuring Nuclear Relatation Times, The Review of Scientific Instruments, 29, (1958) 688–691.

Clark et al., Evaluation of a Deconvolution Approach to the Analysis of NMR Relaxation Decay Functions, Journal of Magnetic REsonance, 41, 42–60 (1980).

LeBlanc et al., Effects of Pressure Processing on Frozen Stored Muscle Proteins of Atlantic Cod Fillets Journal of Food Processing and Preservation, vol. 11, No. 3, p. 210, 215–222, 225, 230–231 (1987).

Johnston, High Pressure—A New Dimension to Food Processing, Chemistry and Industry Review, No. 13, pp. 499–501 (Jul. 4, 1994).

Shoji et al., Gelation of Salted Paste of Alaska Pollack by High Hyrostatic Pressure and Changes in Myofibrillar Proteins in It Bulletin of the Japanese Society of Scientific Fisheries, vol. 56, No. 12, pp. 2069–2076 (1990).

Ko et al., Effect of High Pressure Treatment on the Thermal Gelation of Sardine and Alaska Pollack Meat and Myosin Pastes Journal of Japanese Society of Food Science and Technology, vol. 37, No. 8, pp. 637–642 (1990).

(List continued on next page.)

*Primary Examiner*—David Lacey
*Assistant Examiner*—Drew Becker
*Attorney, Agent, or Firm*—James J. Farrell

[57] ABSTRACT

A process for obtaining a frozen fish product comprises: treating frozen or non-frozen fish, which comprises molecules of myosin and molecules of actin, each molecule of myosin having a head region (6) and a tail region (8), such that the conformation of the head region of the molecule of myosin changes irreversibly and the conformation of the molecule of actin does not change completely and irreversibly; and storing the fish under freezing conditions. Suitable treatments for affecting the conformational change include application of pressure. The treated fish product has an increased resistance to frozen deterioration of texture.

5 Claims, 6 Drawing Sheets

OTHER PUBLICATIONS

Ishizaki et al., Stability of Fish Myosins and Their Fragments to High Hydrostatic Pressure, Fisheries Science, vol. 61, No. 6, pp. 989, 990, 992 (1995).

Iso et al., Differential Scanning Calorimetry of Pressurized Fish Meat, Fisheries Science, vol. 60, No. 1, p. 127–128 (1994).

Shoji et al., Effect of Storage Temperature on Changes in Gel Strength of Myofibrillar Protein of Pressure–Induced Gel of Walleye Pollack Surimi, Bulletin of the Japanese Society of Scientific Fisheries, vol. 58, No. 2, 1992, pp. 329–336.

PROCESS FOR PROVIDING A FROZEN FISH PRODUCT

TECHNICAL FIELD OF INVENTION

This invention relates to a process for providing a frozen fish product wherein the fish has at least some resistance to frozen deterioration. The invention also relates to a frozen fish product produced by the process of the invention wherein the fish has at least some resistance to frozen deterioration.

BACKGROUND TO THE INVENTION

Fish muscle comprises fibres having a typical diameter of 30 to 200 microns. These fibres comprise myofibrils having a typical diameter of 1 to 2 microns.

Figure 1:
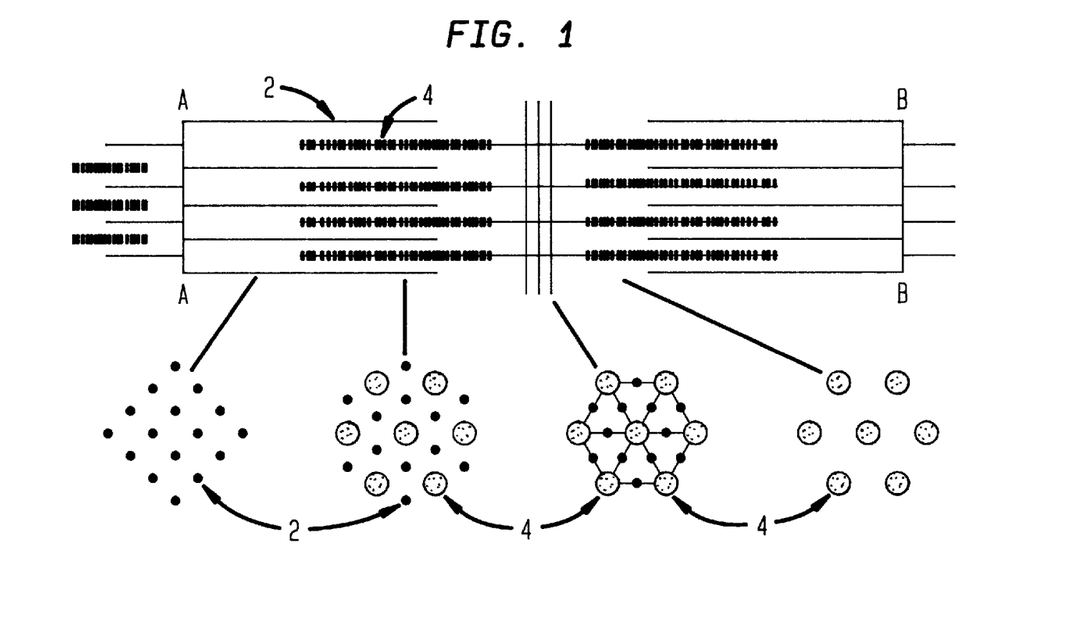
FIG. 1 is a diagrammatic representation of the ultrastructural organization within a myofibril, together with diagrammatic cross sectionional views thereof.

The myofibril is built up of many sarcomeres aligned end to end. One sarcomere may be defined as the structure lying between adjacent lines AA and BB of FIG. 1.

Within each sarcomere are thin filaments 2, comprising mainly the protein actin, together with thick filaments 4, comprising mainly the protein myosin. These filaments are organised into a lattice structure, as illustrated by the cross sectional views of FIG. 1.

Figure 2:
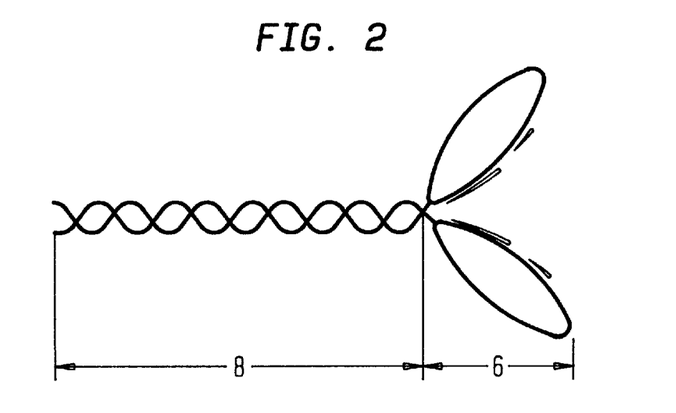
FIG. 2 is a diagrammatic representation of a myosin molecule.

The myosin molecule consists of a head region 6 and a tail region 8.

It has been shown by Yamamoto et al, Biosci Biotech Biochem, 57, 383 (1993) that the application of ultra high pressure will denature the head region of the myosin molecule and that this denaturation is likely to occur at lower pressures than those required to denature the myosin tail region. It has also been shown that pressures below 500 MPa do not fully denature the myosin molecule (McArthur & Wilding, Gums and Stabilisers in the Food Industry Vol 8, Phillips, Williams & Wedlock, IRL Press, 309–317 (1995)).

Fish, either as fillets or mince or as part of a more complex product such as fish fingers, has the problem that it deteriorates on prolonged frozen storage (for example, storage for 6 months at −10° C.). On thawing, the texture of the fish is quite different to the texture of fresh fish. Typically, the thawed fish appears wet, will lose water even on gentle squeezing, and has an opaque appearance. The differences between fresh fish and thawed fish persist after cooking; the thawed fish has a grey rather than white appearance, is more chewy, dry and fibrous, and exhibits increased water loss during cooking.

The rate of textural decline of frozen fish is predominantly governed by the temperature at which it is stored and the fish species: fish of the Gadoid species (eg Cod, Alaska Pollack, Saithe, Whiting and Haddock) are particularly prone to frozen deterioration.

The textural changes resulting from the freezing and frozen storage of fish have been attributed to changes in the myofibrils.

Jarenback et al, in the Journal of Food Technology, vol 10, p 229 (1975), observed a decrease in the dimensions of the lattice structure described above in frozen cod samples which had undergone textural deterioration. Also, they observed disturbances to the lattice.

It is understood that during freezing and frozen storage, water is displaced from myofibrils and forms ice crystals. Upon thawing, the water is not able to return to its original location because the myofibrils' lattice structure is not able to return to its original dimensions. Hence, textural deterioration results.

It is therefore desirable to be able to slow or prevent frozen deterioration, so enabling displaced water to return to myofibrils upon thawing.

We have now shown that it is possible to provide fish with at least some resistance to frozen deterioration, by subjecting the fish to a treatment which irreversibly changes the conformation of the head region of the myosin molecule, such that it is unable to revert back to the conformation observed in untreated samples, but does not completely and irreversibly change the conformation of the actin molecule. This means that the myosin head region is at least partially denatured as a result of this treatment, whilst the actin molecule may be partially denatured but is not completely denatured.

An article by D Farr in Trends in Food Science & Technology, vol 1, 1990, p 14–16 discusses the effects of high hydrostatic pressure on protein denaturation and states that such denaturation has been attributed to the pressure-induced unfolding of the protein chains. It also mentions that the use of moderate hydrostatic pressures, in combination with sub-zero temperatures, has been proposed as a means of storing food products without the formation of ice, thereby avoiding damage due to freezing.

This avoidance of damage is achieved by applying pressure to lower the freezing point of water and storing the food product at a sub-zero temperature which is greater than the lowered freezing point of water, such that the water in the food product does not freeze and thus can not form damaging ice crystals.

An article by D E Johnston in Chemistry & Industry, no 13, 1994, p 499–501 mentions that pressure treatment can result in reversible or irreversible enzyme denaturation, and that high pressure offers a means of controlled protein unfolding. It also states that rapid uniform freezing can be made to take place by cooling a food below its freezing point under high pressure and then releasing the pressure, thus giving rise to less textural damage when the food is thawed.

As a result of the almost immediate freezing provided by this technique, ice crystals have little time to grow so they are very small and distributed evenly throughout the food. Hence, textural damage is reduced in comparison to a traditionally frozen food, which contains bigger ice crystals, which cause greater textural damage as a consequence of their size.

However, a problem with this technique is that heat is generated as the ice is formed. If this heat is not removed, the food rises in temperature and thaws. Another problem is that the technique does not prevent the small ice crystals from growing during frozen storage, so textural damage may still occur.

An article by I N A Ashie and B K Simpson in Food Research International, Vol 29 No5–6, pp569–575, 1996, discusses the effect of high hydrostatic pressure on seafood enzymes and relates this to seafood texture deterioration. However, there is no discussion of the effect of pressure on myosin and actin molecules in fish. There is no mention of subsequent freezing or of controlling water loss on frozen storage of the seafood.

SUMMARY OF THE INVENTION

According to the present invention there is provided a process for obtaining a frozen fish product having at least some resistance to frozen deterioration, the process comprising:

i) treating frozen or non-frozen fish, which comprises molecules of myosin and molecules of actin, each molecule of myosin having a head region and a tail region, such that the conformation of the head region of the molecule of myosin changes irreversibly and the conformation of the molecule of actin does not change completely and irreversibly; and ii) storing the fish under freezing conditions.

The invention also provides a frozen fish product produced by the process of the invention wherein the fish has at least some resistance to frozen deterioration.

Frozen deterioration, ie. the loss of texture noted on prolonged frozen storage of fish, is either delayed, slowed down or prevented using this invention.

That is, the present invention allows the tendency of fish texture to deteriorate on freezing, in particular to lose water on thawing, cooking, etc to be reduced.

Preferably, the fish undergoes a pressure treatment.

It is important that the conformation of the actin molecule is not completely and irreversibly changed during the treatment of the fish, otherwise the organised structure of the myofibril substantially disintegrates and the ability of the myofibril to retain water on cooking is reduced.

Also, it is not desirable to change irreversibly the conformation of the tail region of the myosin molecule during the treatment.

Any changes in conformation of the actin molecules and the head and tail regions of the myosin molecules may be determined by a number of methods, including Differential Scanning Calorimetry (DSC), which detects the change in enthalpy associated with a change in conformation as the sample is heated.

A reduction in enthalpy is observed using DSC when the conformation of the head region of the myosin molecule is irreversibly changed (ie the protein is at least partially denatured).

Should the conformation of the actin molecule or the tail region of the myosin molecule be completely and irreversibly changed (ie as a result of complete protein denaturation), the energetic events associated with the unfolding of these proteins are no longer observable in DSC heating profiles.

The exact pressure required to produce the desired selective protein denaturation will depend upon, for example, the species of the fish, its temperature and the length of time for which the pressure is applied.

When pressure is used to treat the fish, the desired conformational change in the head region of the myosin molecule may be achieved by applying a pressure which preferably exceeds 50 MPa, optionally exceeding 100 MPa and is preferably less than 300 MPa, more preferably less than 250 MPa, more preferably less than 200 MPa and most preferably less than 150 MPa. Preferred ranges are 50 to 300 MPa, more preferably 50 to 150 MPa, in the temperature range 0 to 15° C. for a time of 20 minutes.

Higher pressures may be used under some circumstances, if the treatment time and/or temperature is lower. The tests described above will allow the skilled person to determine whether the required controlled conformational changes have occurred.

The pressure treatment may be carried out for any suitable period of time, being preferably in the range 5 to 40 minutes, more preferably in the range 10 to 30 minutes.

The pressure treatment is carried out at any suitable temperature, for example in the range 5–20° C. The fish may for convenience be at about ambient temperature at the beginning of the process. The temperature may increase as a result of the pressurization. It is preferred, however, that the temperature of the fish during the pressure treatment remains below that at which substantial denaturation of the myosin molecule might occur, ie. below 40° C. The fish may be in a frozen state before the pressure treatment commences.

The fish is preferably frozen for storage in step (ii) to a temperature below −5° C., more preferably below −10° C.

DETAILED DESCRIPTION OF THE DRAWINGS

In FIGS. 3 to 5, the y axis is amplitude and the x axis is log spin-spin relaxation time.

In FIGS. 6 and 7, the y axis is heat flow (mW) and the x axis is temperature (°C.). The scan rate for the DSC heating profile is 0.5 degrees/minute.

DETAILED DESCRIPTION OF THE INVENTION

EXAMPLE 1

Samples of fresh cod fillet weighing approximately 200 g each were vacuum sealed into bags after about 2 days on ice. A pressure of 200 MPa was applied to the samples for 20 minutes. At the beginning of the pressure treatment, the samples had a temperature of 5° C. Since the pressure equipment had no means of temperature control, the temperature of the samples increased during the pressure treatment by approximately 5 to 10° C. After the pressure treatment, the samples were blast frozen at −30° C. for two hours and stored at −12° C.

After 0 months, 2 months and 5 months of storage, pieces were removed from the frozen samples. These pieces were sealed into nuclear magnetic resonance tubes and allowed to thaw. A polytetrafluoroethene insert was placed above each piece to minimise water loss due to evaporation. Once thawed, the pieces were heated at 80° C. for 15 minutes in a water bath, and cooled to room temperature.

Pulsed proton nuclear magnetic resonance (NMR) is a technique which may be employed to measure the water loss from fish samples on cooking. The spin-spin ($T_2$) of water protons is dependent upon their interaction with the proteins of the sarcomere. Water molecules within the myofibrils will have shorter spin-spin relaxation times than those in thaw-loss and cook-out liquid.

As frozen deterioration of texture progresses, more and more water is unable to return to the myofibrils upon thawing. Thus, more water is lost on cooking and the cooked frozen-fillet becomes firmer and drier relative to cooked fresh fillets. Consequently, more water molecules with longer relaxation times will be observed in the cooked fillet, i.e. the distribution of spin-spin relaxation times will shift towards those of free cook-out liquid.

The spin-spin relaxation times of the cooked pieces were measured on an NMR spectrometer (model CXP from the German company Bruker) operating at 60 MHz, using the Carr-Purcell[1]-Meiboom-Gill[2] pulse sequence, with a tau spacing of 200 µS and a 30 second delay between pulse trains. The decay data was analysed by the Fourier Transform method of Roessler, modified by Hunt, to provide the $T_2$ distribution plot[3] of FIG. 3.

Figure 3:
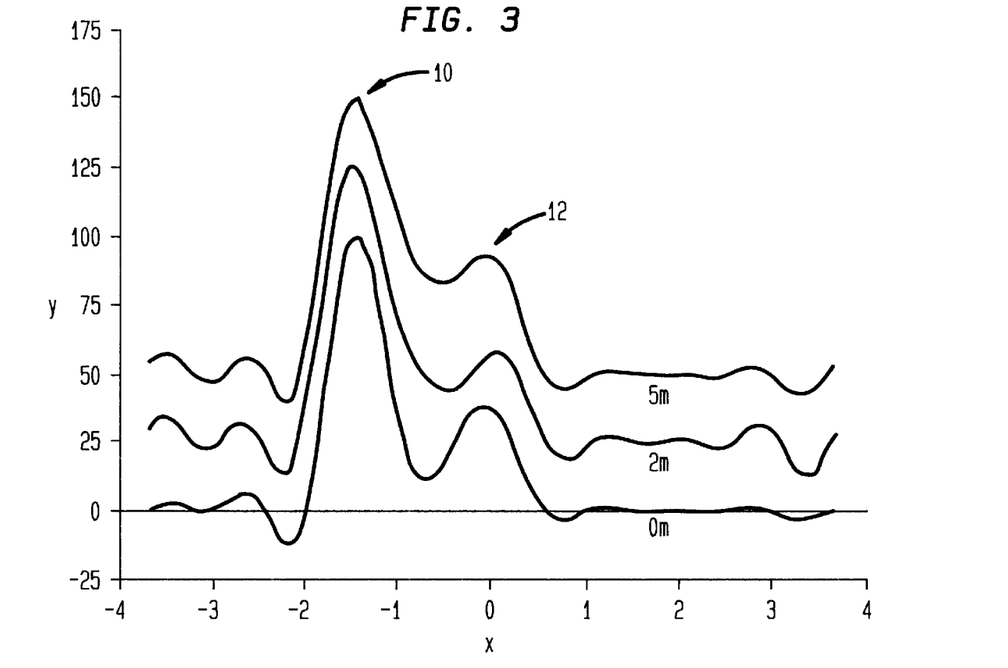
FIG. 3 is a graph showing the water distribution in cod fillet after a pressure treatment of 200 MPa, frozen storage at −12° C. for 0, 2 and 5 months and cooking.

[1] Carr & Purcell, Phys Rev, 94, 630–638 (1954)
[2] Meiboom & Gill, Rev Sci Instrumen, 29, 688–691 (1958)
[3] Clarke & Lillford, J Mag Res, 41, 42–60 (1980)

EXAMPLE 2

The method of example 1 was repeated, except that the samples were not pressure treated.

Figure 4:
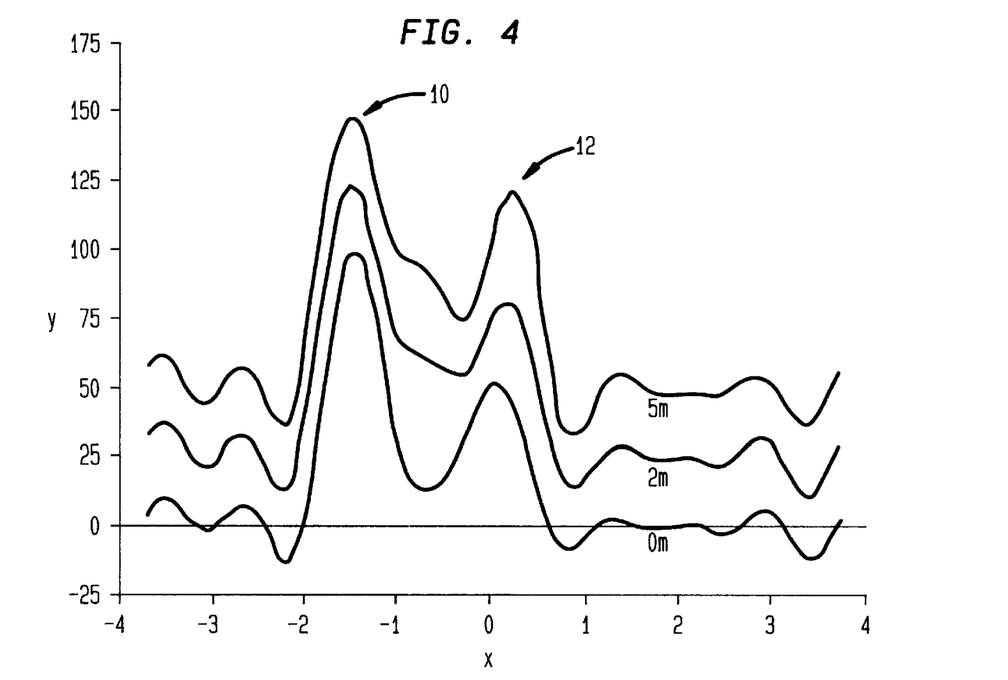
FIG. 4 is a graph showing the water distribution in untreated cod fillet after frozen storage at −12° C. for 0, 2 and 5 months and cooking.

FIG. 4 is the resulting $T_2$ distribution plot.

EXAMPLE 3

The method of example 1 was repeated, except that the samples were treated with a pressure of 400 MPa.

Figure 5:
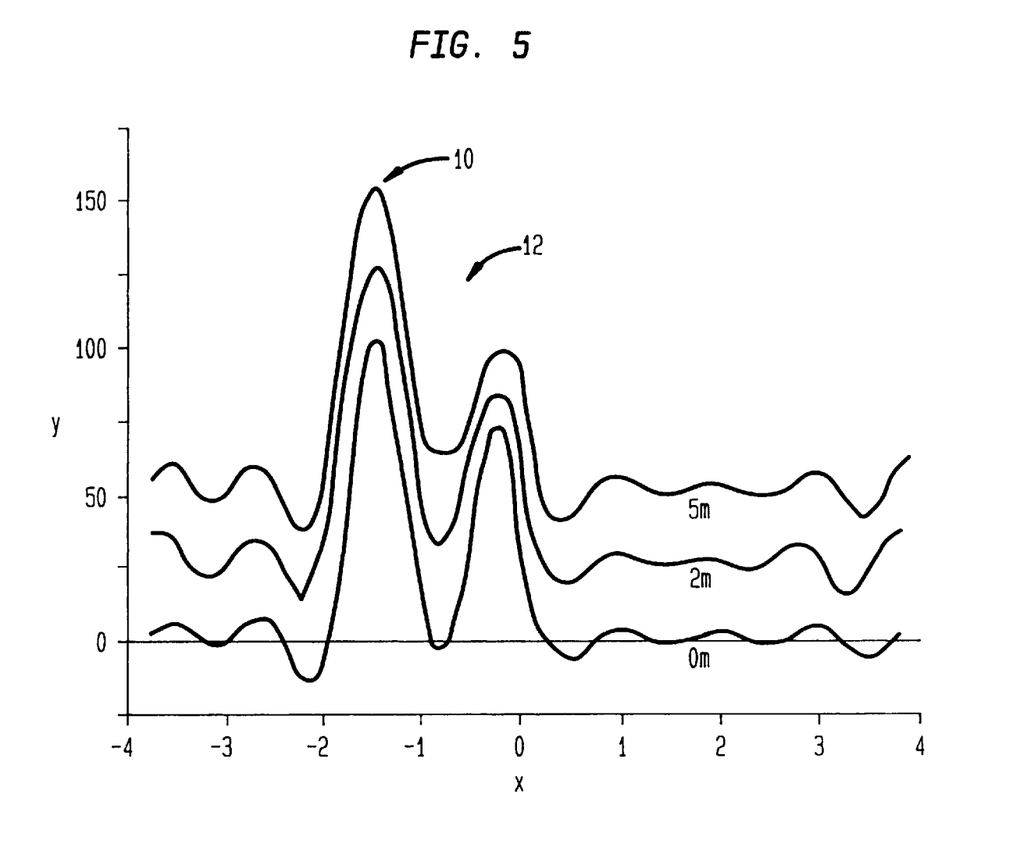
FIG. 5 is a graph showing the water distribution in cod fillet after a pressure treatment of 400 MPa, frozen storage at −12° C. for 0, 2 and 5 months and cooking.

FIG. 5 is the resulting $T_2$ distribution plot.

RESULTS

In FIGS. 3 to 5, peak 10 is the water associated with the myofibrils and peak 12 is the "free" water. The distributions are labelled 0 m, 2 m and 5 m to refer to storage times of 0 months, 2 months and 5 months respectively.

"Free" water may be defined as water protons with a spin-spin relaxation time of the same order of magnitude as ordinary water, i.e. approximately 1 second.

From the results for a non pressure treated sample in FIG. 4 it can be seen that the change in water distribution of the cooked samples becomes greater as the length of time of frozen storage increases. This is because frozen deterioration increases as the frozen storage time increases, resulting in more water being lost on cooking, i.e. the amount of "free" water increases, at the expense of water within the myofibrils.

From the results for the pressure treated sample in FIG. 3 it can be seem that there is very little change in water distribution of the cooked samples after frozen storage. It is therefore concluded that the pressure treatment has significantly slowed the frozen deteriorative process in cod.

From the results for a sample treated at a pressure of 400 MPa in FIG. 5, it can be seen that the changes in water distribution vary little as a result of length of time of frozen storage, but that a great deal of water is lost during cooking. This suggests that 400 MPa (at the temperature and time applied) is too high a pressure treatment to maintain the water holding capacity of the cod samples on cooking. It is concluded that 400 MPa causes complete denaturation of the actin molecules in cod (ie causes a complete and irreversible change in the conformation of the actin molecules).

EXAMPLE 5

Samples of fresh cod fillet weighing approximately 200 g each were vacuum sealed into bags after about 2 days on ice. A pressure of either 0, 50, 100, 150, 200, 300 or 400 MPa was applied to the samples for 20 minutes. The temperature range experienced by the samples during the compression and decompression stages of the pressure treatment was 0° C. to 15° C. (the pressure equipment had no means of temperature control, so the temperature of the samples increased during the pressure treatment).

Figure 6:
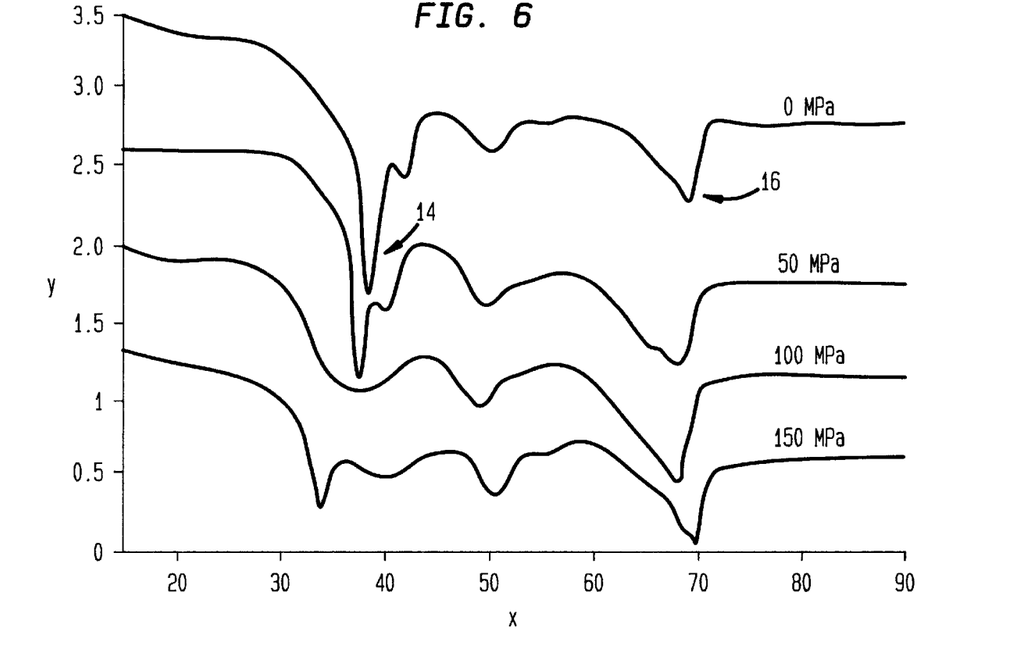
FIG. 6 is a graph showing four DSC heating profiles for cod fillet after pressure treatments of 0, 50, 100 and 150 MPa respectively.
Figure 7:
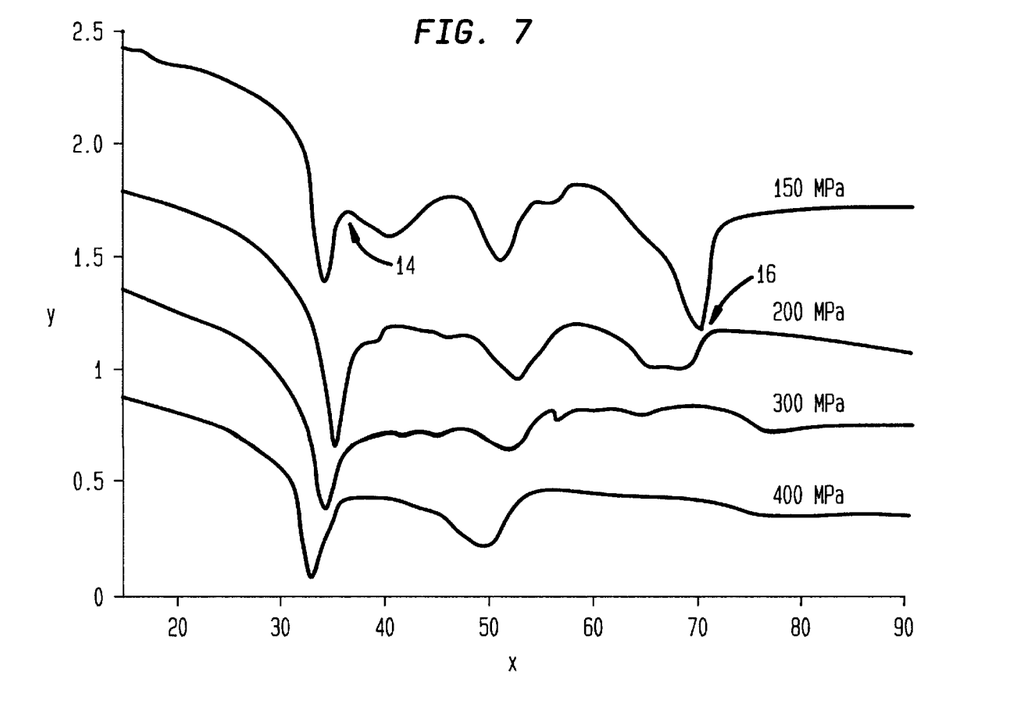
FIG. 7 is a graph showing four DSC heating profiles for cod fillet after pressure treatments of 150, 200, 300 and 400 MPa respectively.

DSC heating profiles were measured for each sample to assess the degree of denaturation of the myosin and actin molecules; FIGS. 6 and 7 are the resulting profiles.

RESULTS

In FIGS. 6 and 7, the area under peak 14 shows the change in enthalpy associated with a change in conformation of the head region of the myosin molecule and the area under peak 16 shows the change in enthalpy associated with a change in conformation of the actin molecule.

These figures show how increasing the hydrostatic pressure applied to cod fillet can substantially modify the differential scanning calorimetric heating profile of the fillet. As the pressure is increased above 50 MPa, a change in the conformation of the head region of the myosin molecule is observed; above 200 MPa, no further changes in denaturation of the head region are observed. As the pressure is increased above 200 MPa, the energetic peak associated with the unfolding of the actin molecule is lost/very much reduced.

From FIG. 7 it can be seen that, as the pressure treatment is increased from 200 MPa to 400 MPa, the energy event associated with denaturation of the actin molecule is lost. This suggests that, as a result of the pressure treatment, complete denaturation of the actin molecule has occured (ie its conformation has completely and irreversibly changed) and the water holding capacity of the fillet is reduced, such that more water is lost on cooking.

Thus, cod fillets may be subjected to a pressure treatment of from 50 to 300 MPa, preferably 100 to 250 MPa, in the temperature range 0 to 15° C. for 20 minutes, to achieve at least some resistance to frozen deterioration.

EXAMPLE 6

Samples of fresh cod fillet weighing approximately 200 g each were vacuum sealed into bags after about 2 days on ice. A pressure of either 0, 50, 75, 100, 125, 150, 175, 200, 250 or 300 MPa was applied to the samples for 20 minutes. The temperature range experienced by the samples during the compression and decompression stages of the pressure treatment was 0° C. to 150° C. (the pressure equipment had no means of temperature control, so the temperature of the samples increased during the pressure treatment).

The denaturation of the samples was assessed by measuring water loss on cooking. Cooking took place in the bags at 80° C. for 15 minutes. Thereafter, the samples were cooled. The liquid in the bags was drained off and weighed. The samples were then blotted with paper towel and weighed. The "cook-out loss" defined as weight % water loss was then calculated.

RESULTS

Figure 8:
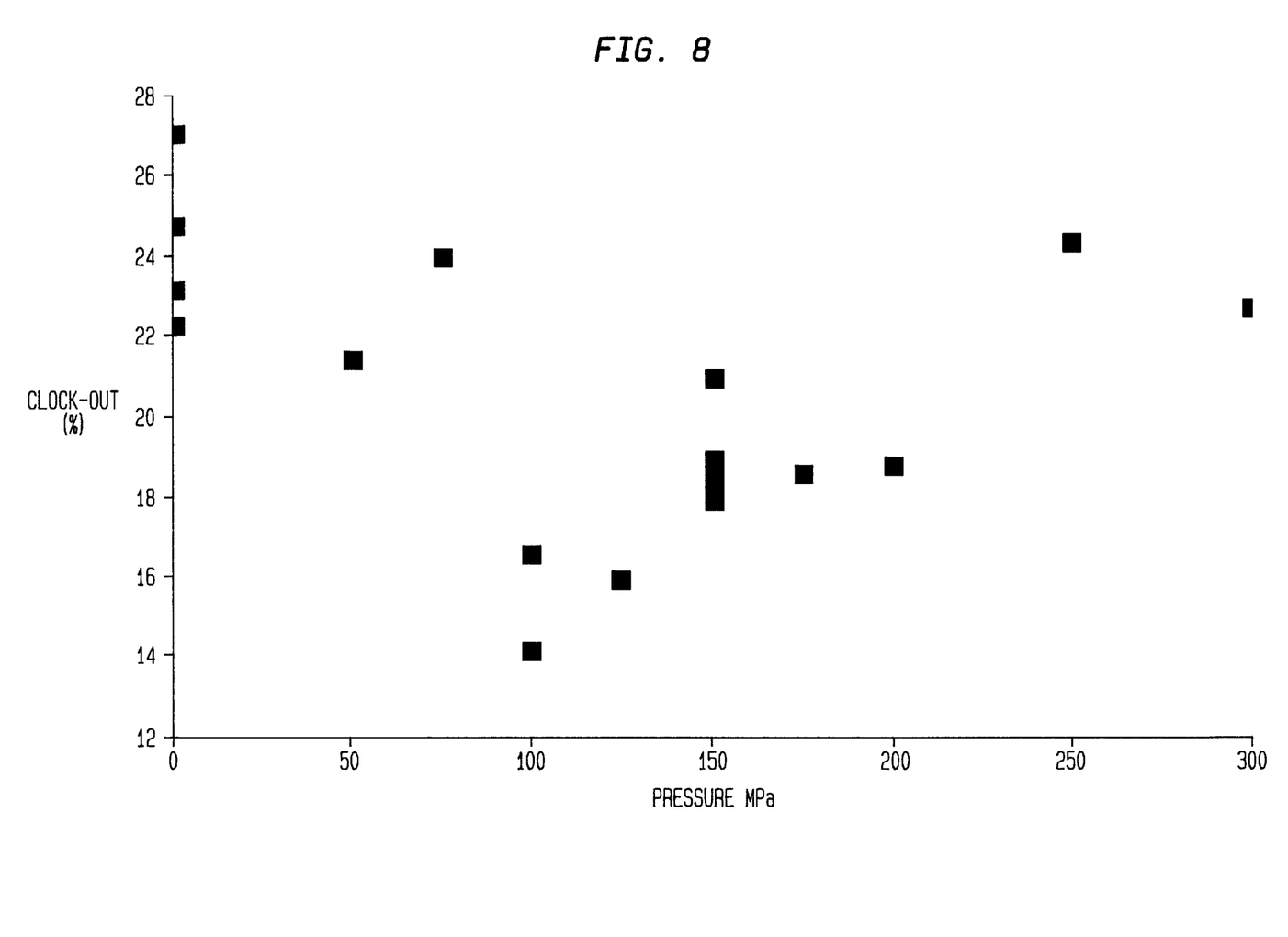
FIG. 8 is a graph showing results of experiments to measure cook-out of water of fish samples treated at various pressures.

The results shown in FIG. 8 demonstrate a reduction in cook-out loss for pressure treatments at pressures in the range 50–200 MPa

EXAMPLE 7

Samples of a processed product in the form of a conventional cod fish finger were manufactured as follows.

Eight fresh cod fillets were obtained. Four were stored at 2° C. to provide control samples. Four were cut into smaller pieces and vacuum sealed into bags to provide test samples. The bags were placed in plastic bottles containing iced water. The bags in the bottles were treated at 100 MPa for 20 minutes. The temperature in the pressure vessel could not be controlled but the final temperature of the treated samples was in the range 1–5° C.

The control and treated samples were each placed in aluminium moulds of size 18 cm by 38 cm by 2 cm and were blast frozen overnight at −30° C.

The frozen samples were removed from the moulds and sawn into 1 cm by 2 cm by 8.5 cm blanks. These blanks were coated with breadcrumbs by a conventional process to provide fishfingers. The fishfingers were stored at −80° C. They were then tempered to −20° C. and the coating removed.

The samples were sealed into nuclear magnetic resonance tubes and allowed to thaw. A polytetrafluoroethene insert was placed above each piece to minimise water loss due to evaporation. Once thawed, the pieces were cooked at 80° C. for 15 minutes in a water bath, and cooled to room temperature.

Water distribution in the fish core was then studied by the NMR method of example 1.

RESULTS

Figure 9:
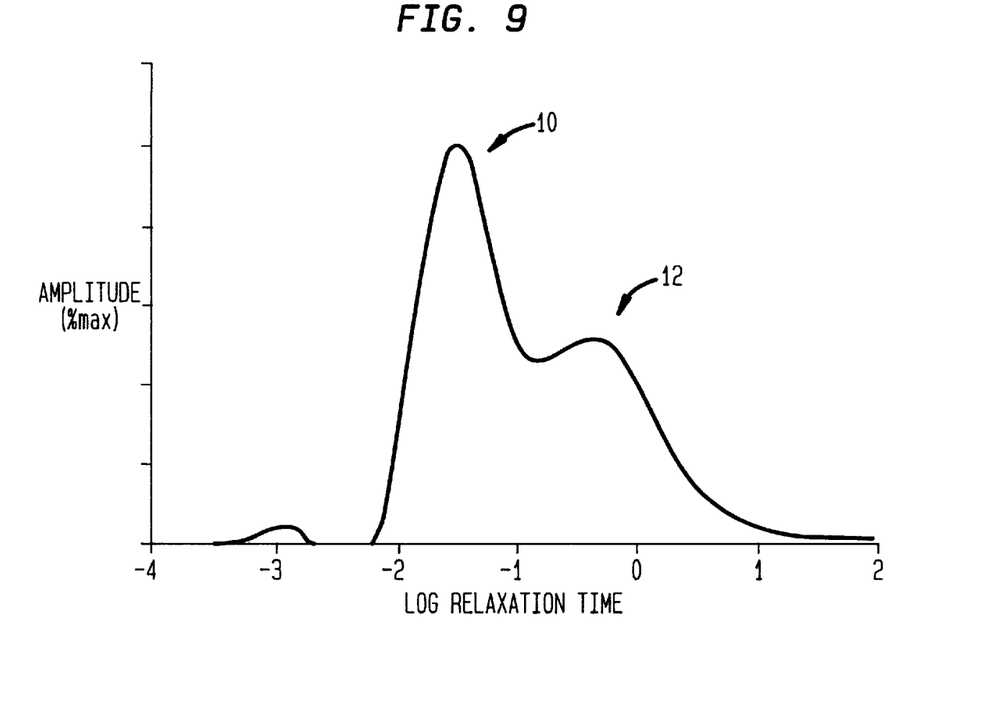
FIG. 9 is a graph showing water distribution in the fish core of a processed product which has been frozen to −80° C., thawed and cooked.
Figure 10:
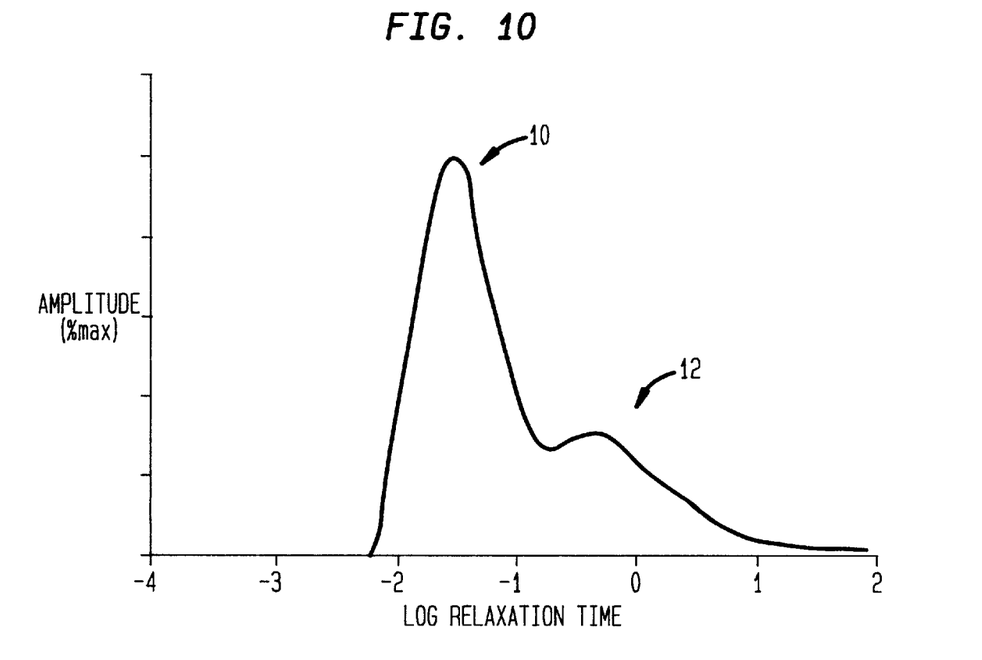
FIG. 10 is a graph showing water distribution in the fish core of a processed product which has been pressure treated at 100 Mpa, frozen to −80° C., thawed and cooked.

The results for the samples are shown in FIGS. 9 and 10.

In FIGS. 9 and 10, peak 10 is the water associated with the myofibrils and peak 12 is the "free" water.

"Free" water may be defined as water protons with a spin-spin relaxation time of the same order of magnitude as ordinary water, i.e. approximately 1 second.

It can be seen that the peak 12 for free water in the pressure treated samples shown in FIG. 10 is much lower than the corresponding peak 12 in the results for untreated fish fingers in FIG. 9. This shows that the present invention is applicable to reducing the deterioration on freezing of fish in processed form as well as fillets.

EXAMPLE 8

Samples of fresh cod fillet weighing approximately 50–55 g were each vacuum sealed into bags after about 2 days on ice. The samples were divided into test samples and control samples. The samples were then frozen in a plate freezer to −30° C. Control samples were retained until needed. A pressure of 100 MPa was applied to test samples for 20 minutes. The pressure equipment had no means of temperature control, so the temperature of the samples increased during the pressure treatment but without thawing them.

The denaturation of the test and control samples was assessed by measuring water loss on cooking. Cooking took place, after thawing, at 80° C. for 15 minutes. Thereafter, the samples were cooled. The liquid in the bags was drained off and weighed. The samples were then blotted with paper towel and weighed. The "cook-out loss" defined as weight % water loss was then calculated.

RESULTS

The results are shown in the following table.

| Sample | bag weight (g) | weight bag + sample/ (g) | weight liquid (g) | weight blotted fish (g) | weight % loss |
|---|---|---|---|---|---|
| Fillet treated at 100 MPa | 4.94 | 60.81 | 5.67 | 45.62 | 18 |
| Control fillet | 4.84 | 55.64 | 10.00 | 36.63 | 28 |

These results clearly show a reduction in cook-out loss in samples which have been pressure treated while frozen compared to untreated samples.

The present invention has been described above by way of example only.

We claim:

1. A process for obtaining a frozen fish product having at least some resistance to frozen deterioration such that the water holding capacity on thawing and cooking is increased, the process comprising:

i) pressure treating within the range of 50–250 MPa frozen or non-frozen fish, which comprises molecules of myosin and molecules of actin, each molecule of myosin having a head region and a tail region, such that the conformation of the head region of the molecule of myosin changes irreversibly and the conformation of the molecule of actin does not change completely and irreversibly; and ii) storing the pressure treated fish under freezing conditions.

2. A process according to claim 1, wherein the conformational change of the head region of the molecule of myosin is achieved by subjecting the fish to a pressure treatment of from 50 to 150 MPa.

3. A process according to claim 2, wherein the fish has a temperature of less than 40° C. during the pressure treatment.

4. A process according to claim 1, wherein the fish is a member of the Gadoid Genus.

5. A process according to claim 1, wherein the fish is selected from the group consisting of Cod, Alaska Pollack, Saithe, Whiting and Haddock.

* * * * *